Figure 1:
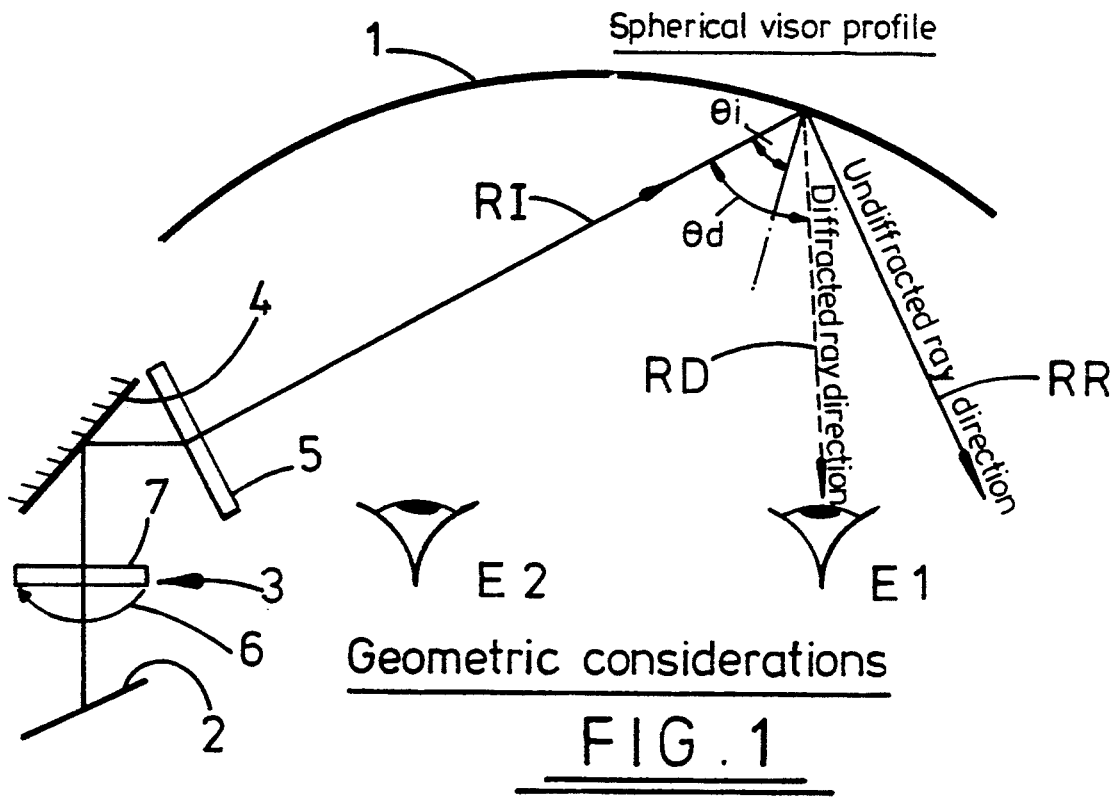

United States Patent

Roberts et al.

[11] Patent Number: 5,396,349
[45] Date of Patent: Mar. 7, 1995

[54] LATERAL AND LONGITUDINAL CHROMATIC DISPERSION CORRECTION IN DISPLAY SYSTEMS EMPLOYING NON-CONFORMAL REFLECTION HOLOGRAMS

[75] Inventors: Martin D. Roberts; Anthony J. Kirkham; David G. Norrie, all of North Wales, United Kingdom

[73] Assignee: Pilkington P.E. Limited, United Kingdom

[21] Appl. No.: 919,060

[22] Filed: Jul. 23, 1992

[30] Foreign Application Priority Data

Jul. 25, 1991 [GB] United Kingdom ............... 9116108

[51] Int. Cl.$^6$ .......................... G03H 1/00; G02B 5/32
[52] U.S. Cl. .......................................... 359/14; 359/15
[58] Field of Search .............................. 359/13, 14, 15

[56] References Cited

U.S. PATENT DOCUMENTS

| | | | |
|---|---|---|---|
| 3,940,204 | 2/1976 | Withrington | 359/19 |
| 4,218,111 | 8/1980 | Withrington et al. | 359/13 |
| 4,613,200 | 9/1986 | Hartman | 359/15 |
| 4,669,810 | 6/1987 | Wood | 359/15 |

FOREIGN PATENT DOCUMENTS

| | | | |
|---|---|---|---|
| 0151455 | 8/1985 | European Pat. Off. | G02B 27/00 |
| 0278395 | 8/1988 | European Pat. Off. | G02B 27/00 |
| 0344810 | 12/1989 | European Pat. Off. | G02B 27/00 |
| 0405540 | 1/1991 | European Pat. Off. | G02B 27/00 |
| 2161615 | 1/1986 | United Kingdom | G02B 27/10 |
| 2197728 | 5/1988 | United Kingdom | G02B 5/32 |
| 2213951 | 8/1989 | United Kingdom | G02B 5/23 |
| 2240853 | 8/1991 | United Kingdom | G02B 27/00 |
| WO8805553 | 7/1988 | WIPO | G02B 27/00 |
| WO8912840 | 12/1989 | WIPO | G02B 27/00 |

OTHER PUBLICATIONS

R. N. Winner & J. H. Brindle, "A Holographic Visor Helment-Mounted Display System", (a conference paper), 1974 Conference held by the IEEE, pp. 43-53.
R. J. Withrington, "Optical Design of a Holographic Visor Helmet-Mounted Display", SPIE vol. 147, *Computer-Aided Optical Design* (1978), pp. 161-170.

*Primary Examiner*—Loha Ben
*Assistant Examiner*—Darryl J. Collins
*Attorney, Agent, or Firm*—F. Eugene Davis, IV

[57] ABSTRACT

An optical system for a display having a combiner (1) with a non-conformal reflection hologram and in which an intermediate image (II) of a display source is formed at a location in the light path to and spaced from the combiner (1), the system comprising at least one diffractive element (5,7) disposed in the light path between the display source (2) and the intermediate image (II) and arranged to counter, at least partially, the chromatic dispersion of the non-conformal reflection hologram (1).

5 Claims, 2 Drawing Sheets

Application of technique to HMD systems

Geometric considerations

Schematic showing proposed technique

LATERAL AND LONGITUDINAL CHROMATIC DISPERSION CORRECTION IN DISPLAY SYSTEMS EMPLOYING NON-CONFORMAL REFLECTION HOLOGRAMS

This invention concerns improvements in or relating to displays and relates more particularly to optical systems for displays having combiners with non-conformal reflection holograms and displays having such optical systems.

With some displays, such as for example head-up displays, an observer, for example the pilot of an aircraft, looks through a combiner which reflects display light towards him so that he sees an image of the display superimposed on his view through the combiner, e.g. of the outside scene. In avionic uses the light reflected from the combiner is usually collimated so that the display image appears at infinity. Some such displays are mounted on a helmet worn by the observer. This can give rise to geometrical configuration and weight problems in that axial or quasi-axial combiner optical systems can be of considerable weight with most of it in front of the observer's eyes. This is generally undesirable in terms of user comfort and with aircraft pilots can be extremely dangerous in high 'g' and ejection situations. Off-axis systems can use a mechanically supported tilted combiner which tends to introduce undesirable obscurations and discontinuities in the field of view of the outside world. Alternatively the helmet visor may be used as the combiner by depositing a suitable coating as a reflective patch on its inner surface and this can have major advantages. Notably the lack of extra support structure reduces weight and improves weight distribution by keeping the centre of gravity back towards the centre of the observer's head and also there is a better through-world view without discontinuities and with good peripheral vision. It further has advantages in terms of appearance, windblast and ease of manufacture. However, there are problems from the optics aspect in that it is difficult to direct the light to the observer's eyes with simple visor profiles and adopting unduly complex visor profiles is not generally an acceptable option. The physical geometry is not such as to permit the required light direction by simple reflection from the visor and it has therefore been proposed to put on the visor a non-conformal reflection hologram, i.e. a hologram whose reflective properties do not conform with the conventional laws of reflection (by which the angle of incidence equals the angle of reflection) but which effectively reflect light, by diffraction, in a direction which deviates from that of simple reflection (so the angle of reflection does not equal the angle of incidence). British Patent No. 1 489 323 discloses such a system. While the non-conformal reflection hologram approach may be useful with strictly monochromatic display sources it runs into colour difficulties with any appreciable display source bandwidth because of the high dispersion of the hologram. While these difficulties have become apparent particularly in the context of helmet mounted displays, they could appear in other arrangements employing a non-conformal reflection hologram on the combiner.

According to the present invention there is provided an optical system for a display having a combiner with a non-conformal reflection hologram and in which an intermediate image of a display source is formed at a location in the light path to and spaced from the combiner, the system comprising at least one diffractive element disposed in the light path between the display source and the intermediate image and arranged to counter, at least partially, the chromatic dispersion of the non-conformal reflection hologram.

The system may comprise two diffractive elements disposed in the light path between the display source and the intermediate image, one of which may be arranged largely to counter lateral colour and the other of which may be arranged largely to counter longitudinal colour. As explained later, colour dispersion by a diffractive element is an angular effect but can be viewed as longitudinal colour resulting from a finite pupil size and lateral colour resulting from a finite image size (or finite field of view) and the terms 'lateral colour' and 'longitudinal colour' are used herein in that sense. The diffractive element which largely counters lateral colour may basically take the form of a lined diffraction grating and be located towards the conjugate position of the non-conformal reflection hologram with respect to the intermediate image. The diffractive element which largely counters longitudinal colour may basically take the form of a circular diffraction grating, preferably takes the form of a surface relief hologram in a hybrid doublet (i.e. a combined refractive and diffractive element), and may be located at or near a pupil position. The two diffractive elements may be incorporated in a relay lens which may incorporate a prism.

Alternatively in suitable circumstances the system may have a single diffractive element disposed in the light path between the display source and the intermediate image, which single diffractive element may be located at or near the conjugate position of the non-conformal hologram with respect to the intermediate image.

The invention further provides a display having an optical system as set forth above, and particularly, but not exclusively, a helmet mounted display in which the helmet visor carries the non-conformal reflection hologram and constitutes the combiner. In a binocular display two such systems may be used.

Figure 2:
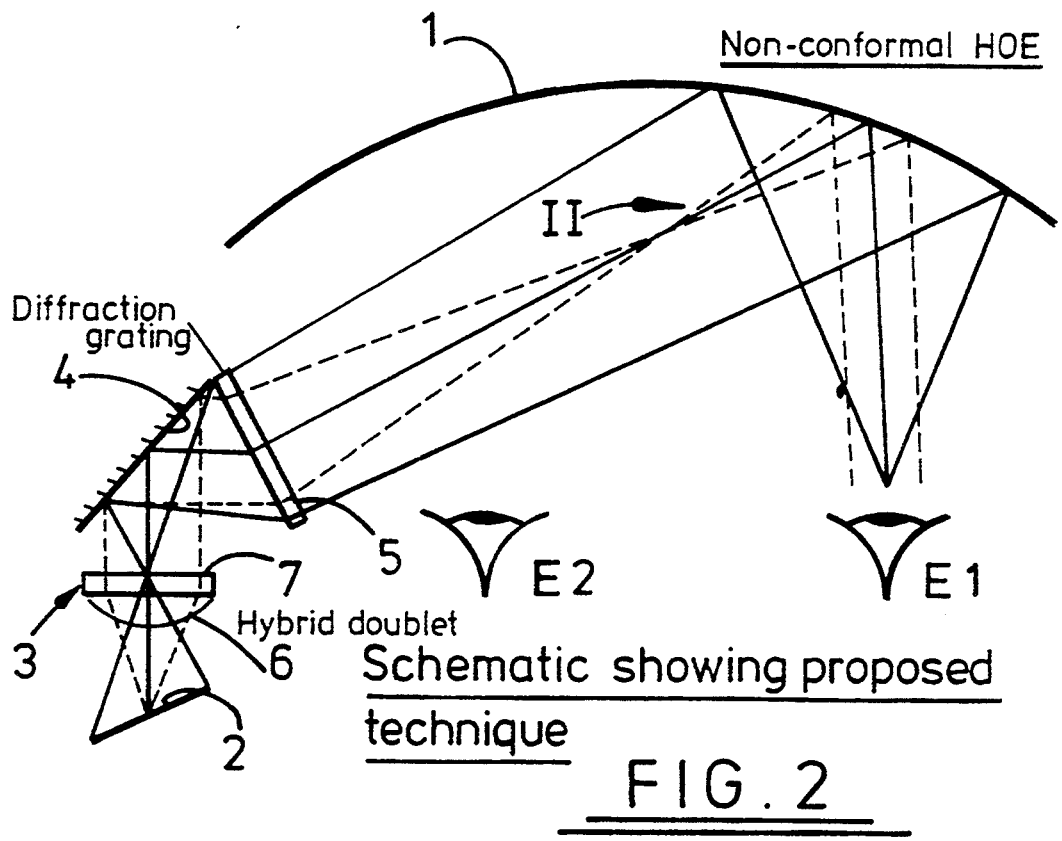
Figure 3:
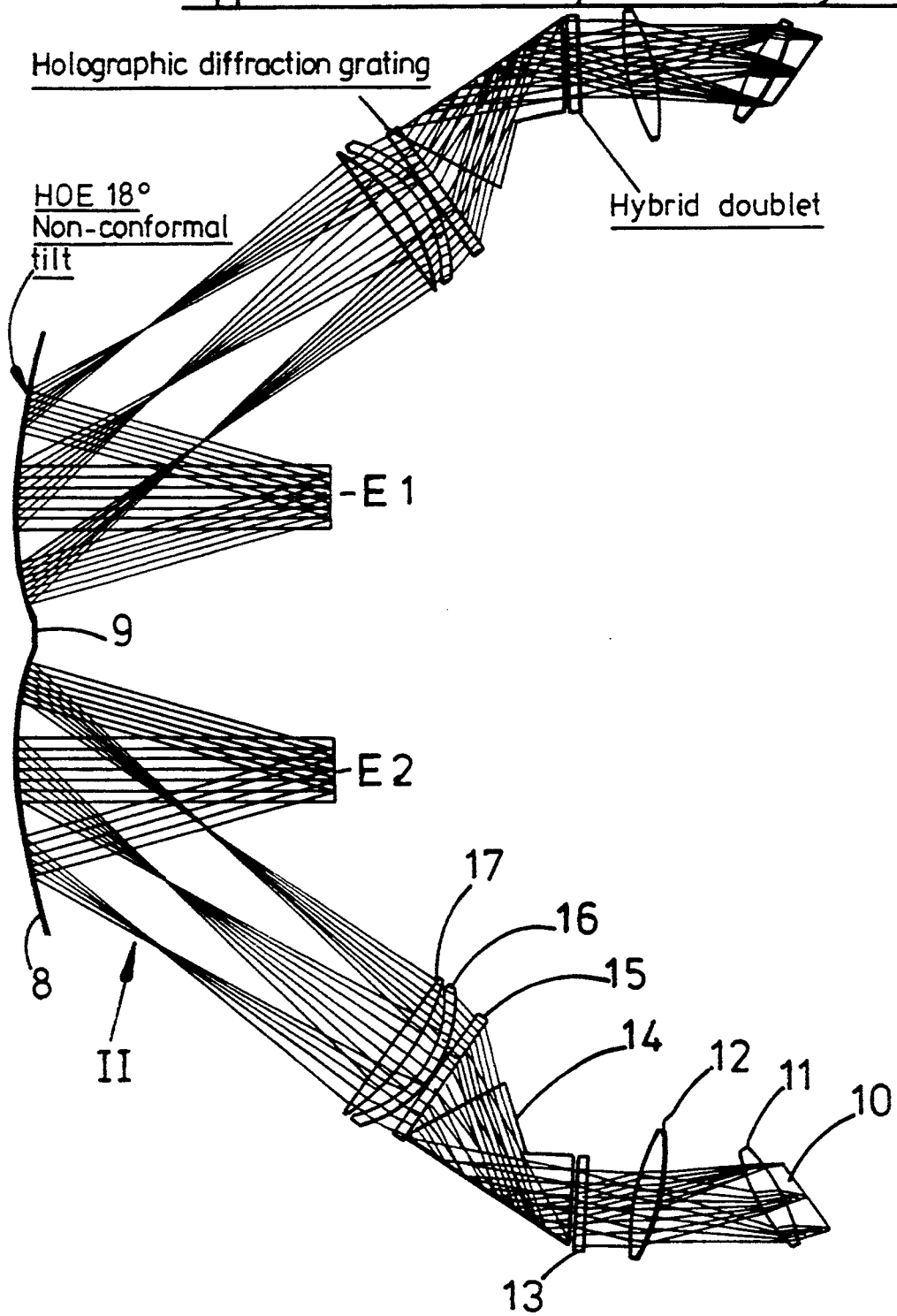

Embodiments of systems in accordance with the invention will now be described, by way of example, with reference to the accompanying drawings, in which:

FIGS. 1 and 2 are schematic representations illustrating certain principles, and FIG. 3 is a diagrammatic representation of a binocular system including a ray trace.

FIG. 1 indicates geometrical considerations of the system. It has a combiner in the form of a helmet visor 1 of spherical profile which carries a non-conformal reflection hologram. An incident ray RI is therefore reflected from the hologram not along the path RR which would be taken if it conformed with the normal laws of reflection (in which the angle between the incident and reflected rays would be twice the angle of incidence) but, because of the diffractive effect of the hologram, along a path RD (with the angle between the incident and reflected rays less than twice the angle of incidence). With this 'sharper' reflection the ray RD is directed to an eye position E1 of an observer in a manner which accommodates the physical geometry of the arrangement. In FIG. 1 the incident light ray RI is shown coming from a display source 2, for example a cathode ray tube or liquid crystal display, via a lens 3, a mirror 4 and a diffractive element 5. The reason for the mirror 4 is simply to bend the light path so as to provide physical space to accommodate the observer's head.

The function of these components is further indicated in FIG. 2.

Referring to FIG. 2, the display source 2 is angled with respect to the optical axis of the system in known manner and light emitted by it passes to the lens 3. This lens is a hybrid doublet having both refractive power and a diffractive effect. For convenience it can be considered as a refractive lens 6 in combination with a diffractive element 7 but in practice the diffractive element is a surface relief hologram formed actually on the surface of the refractive lens. Light transmitted through the lens 6 and diffractive element 7 is reflected from the plane mirror 4 to the diffractive element 5 and transmitted through the latter to form an intermediate image II of the display. This intermediate image is at a position in the light path to and spaced from the combiner 1 and light from the image is reflected by diffraction from the non-conformal hologram to the eye position E1 as previously described. The overall optical power of the system is such that the light reaching the observer's eye position E1 is substantially collimated so that the observer can see an image of the display at infinity superimposed on his view of the outside scene through the combiner.

A diffractive element inevitably has high dispersion and the non-conformal reflection hologram on the visor 1 therefore tends to introduce an undesirable colour spread. A volume holographic diffraction grating will result in typically 0.06 milliradian of dispersion per nanometer per degree of non-conformity. Thus, for example, 18° of non-conformal tilt will result in about 10 milliradians of dispersion for a 10 nanometer waveband display source phosphor. This is generally unacceptable in the viewed image.

Since the combiner is displaced a long way from the system exit pupil (typically one to two times the focal length) the dispersion is a combination of chromatic aberration of principal rays, referred to herein as lateral colour, and chromatic aberration of aperture rays, referred to herein as longitudinal colour. As will be understood by those skilled in the art, the colour spread can be considered as having these two components, namely longitudinal colour resulting from a finite pupil size and lateral colour resulting from finite field angle. Both of these types of chromatic aberration are in fact an angular effect but it is convenient to view one as longitudinal colour in that the angular effect with the finite pupil size spreads the colour along the optical axis.

The purpose of the two diffractive elements 5 and 7 in the system is to counter the colour spread of the non-conformal hologram. To this end the diffractive element 5 is conveniently a lined diffraction grating which may be a conventional type ruled grating or may be of holographic form. It will be understood that the line spacing need not necessarily be constant. The grating is located in similar space to, i.e. towards (but because of physical geometry constraints not actually at) the conjugate or mirror image position of, the combiner 1 with respect to the intermediate image II and largely corrects lateral colour introduced by the hologram on the combiner. It also serves to bend the optical axis which assists configuration around the helmet shell. The bend, i.e. the diffracted angle, is made such that the angular separation between the zero and +1 orders (which is the desired or used one) is sufficiently large such that the zero order is outside the field of view. This means that appreciable correction needs to be given by the grating hologram and dictates a reasonably large holographic wedge in the combiner. The diffractive element 7 is an essentially circular grating analagous to a zone plate and may be a blazed binary element or a transmission hologram. For high efficiency it may take the form of a blazed surface relief hologram on the lens of the hybrid doublet. This diffractive element 7, which has very low power, is located at or near a pupil position and largely counters longitudinal colour (in the sense explained above). It will be understood that there may be some functional overlap between the diffractive elements 5 and 7 and that in combination they introduce opposite dispersion to that introduced by the non-conformal reflection hologram on the visor 1. Ideally they completely compensate for the visor dispersion but in practice the correction may be less than complete but nevertheless a useful improvement providing an adequately colour corrected display image.

FIGS. 1 and 2 show a second eye position E2 which can be fed by a second system, the same as that described for the first eye position E1 but of opposite hand effect. The systems are mounted on the helmet worn by the observer and it will be noted that the system (shown) carried on the left-hand side of the helmet serves the right eye while the system (not shown) carried on the right-hand side would serve the left eye. The respective non-conformal reflective holograms are in the form of circular patches suitably located on the spherical profile visor 1.

The binocular arrangement illustrated in FIG. 3 provides a helmet mounted display with two systems (one for each eye) operating on basically the same principles as described above with reference to FIGS. 1 and 2. The FIG. 3 arrangement, however, has a visor 8 with a central indent 9 so as to provide respective spherical profile parts for the two eyes, each such part carrying its own non-conformal reflective hologram. It will be understood of course, that in FIG. 3 and in FIGS. 1 and 2 only that part of the visor in front of the observer's eyes is shown and that in practice the visor extends also round the sides of the observer's face in known manner. Further in the FIG. 3 arrangement the right-hand optical system serves the right eye while the left-hand optical system serves the left eye (conversely to FIGS. 1 and 2). For convenience only one optical system is described but the left and right-hand systems carried on the helmet are the same but of opposite hand (i.e. mirror images of each other with respect to the central plane containing the indent 9).

Light emitted by a tilted display source 10 is received by a relay lens shown as comprising tilted refractive lens elements 11 and 12, a hybrid doublet 13 effectively having a diffractive element and a refractive element, a shaped prism 14, a diffractive element 15 and a refractive lens elements 16 and 17. It will be understood that the precise design of the relay lens is within the competence of those skilled in the art and that any suitable design may be used employing spherical, toric, cylindrical and/or other aspheric surfaces as required. It will further be understood that the hydrid doublet 13 and diffractive element 15 in FIG. 3 correspond to, and may take basically the same form as, hydrid doublet 6,7 and diffractive element 5 in FIGS. 1 and 2. The prism 14 in FIG. 3 serves a similar path-bending or folding function to the mirror 4 in FIGS. 1 and 2 but the prism 14, being of a material of higher refractive index than air, permits a shorter physical path length. The side of the prism 14 opposite its internally reflecting plane face is indented where the light is not required to travel to provide physical space.

The lined grating diffractive element 15 is located immediately behind the front lens group 16,17 of the relay lens and deviates, bends or folds the optical axis through 27° in a direction away from the observer's head with benefits as previously mentioned in relation to the element 5 of FIGS. 1 and 2. The hydrid doublet 13 consists effectively of a positive low dispersion crown refractive lens element in front of a very high dispersion weak negative diffractive component.

The relay lens produces an intermediate image II of the display and the light is then reflected by diffraction from the non-conformal hologram on the visor 8 to the eye position E2. The non-conformal hologram gives a tilt or wedge of 18° of the effective reflecting plane so that the axis beam undergoes a deviation of 36° in one plane from the conventionally reflected ray direction. If desired it may also have some power to give better compensation or trimming. The diffractive elements incorporated in the relay lens serve to counter, i.e. correct or compensate for, the colour spread of the non-conformal hologram as previously described with reference to FIGS. 1 and 2, the lined grating element 15 being located towards the conjugate position of the non-conformal hologram with respect to the intermediate image and largely correcting lateral colour and the circular grating element in the hybrid doublet 13 being positioned at or near the pupil immediately behind the prism 14 and largely correcting longitudinal colour.

It will be appreciated that the helmet mounted display embodiments specifically described above are given by way of illustration and example and the invention can be used in other arrangements. In the described helmet mounted arrangements it is not permissible for the actual conjugate or mirror image position of the non-conformal hologram with respect to the intermediate image to be occupied by an optical element because of physical geometry constraints and in particular because it would obstruct or interfere with the observer's peripheral vision. In other arrangements where there is no such constraint a diffractive element may be located at that conjugate position and in that case a single diffractive element may achieve substantially the same effect as the two diffractive elements arranged in series as described above. Such single diffractive element would generally be of more complex form than either of the single grating elements since it would counter both lateral and longitudinal colour. It would preferably be holographic and of essentially opposite form to the non-conformal hologram on the combiner. In some circumstances such single diffractive element may be located not actually at but sufficiently near to the conjugate position to give adequate colour correction and/or it may be of a form which does not totally counter but sufficiently corrects colour to give an acceptable display image.

It will further be appreciated that the invention is particularly useful in situations having physical geometry constraints and is potentially generally applicable to various displays having a combiner, such as head-up displays for example, including those in aircraft (e.g. aeroplanes and helicopters) and ground vehicles (e.g. cars and motor cycles) and whether monocular, biocular or binocular, for military or civil use, and head (e.g. helmet) or otherwise mounted. Yet further it will be understood that known techniques of optimising light utilisation or minimising adverse effects of unwanted light may be employed as appropriate in any particular system. For example, masking or baffles may be used to avoid ghosting through unwanted light transmitted at zero or other unused orders by the diffractive element or elements. Further, while the diffractive element or elements which counter the adverse effects of the combiner non-conformal reflection hologram may, as described above, be transmissive in mode, the single one or one or both of the two could alternatively be of reflective mode.

We claim:

1. A display system comprising:
   A) an illuminated image source providing non-monochromatic. light;
   B) a transparent non-conformal reflective holographic combiner element;
   C) means for directing light from said illuminated image source to form a virtual image of said illuminated light source, and to be reflected and affected at said holographic combiner element such that said image has both lateral and longitudinal chromatic dispersion; and
   D) holographic means between said image source and said combiner element for correcting both said lateral and longitudinal chromatic dispersions wherein said holographic means takes the form of both linear and circular gratings.

2. A display system comprising a display source adapted to issue light from a display image, a lens arrangement adapted to form an intermediate image of the display light, and a non-conformal reflection hologram arranged to receive display light from the intermediate image and to direct that light as a substantially collimated beam towards an operator's station, wherein the hologram forms part of an image combiner so that an observer located at said observer's station views the image of the display in superimposition with his view through the combiner, the display source having a bandwidth that is not strictly monochromatic, and longitudinal and lateral chromatic dispersion of the display light generated by the hologram is countered, at least partially, by the provision of finest and second mutually spaced diffractive elements located in the light path between the display source and the intermediate image, the first diffractive element being arranged largely to counter lateral colour and basically taking the form of a lined grating located adjacent the conjugate position of the hologram with respect to the intermediate image, and the second diffractive element being arranged largely to counter longitudinal colour and basically taking the form of a circular grating located adjacent a pupil position of the system.

3. A display system as claimed in claim 2, wherein the second diffractive element takes the form of a surface relief hologram formed on a surface of the lens arrangement.

4. A display system as claimed in claim 2, wherein the lens arrangement comprises a relay lens having distributed elements and the first and second diffractive elements are both located between distributed elements of the relay lens.

5. A display system as claimed in claim 2, wherein the first and second diffractive elements are combined into a single device having the functions of linear and circular gratings, the device being located sufficiently near to the said conjugate position to provide an acceptable display image.

* * * * *